July 23, 1968   L. E. W. POMEROY   3,393,580
POWER UNITS FOR MOTOR VEHICLES
Filed Nov. 24, 1965   7 Sheets-Sheet 1
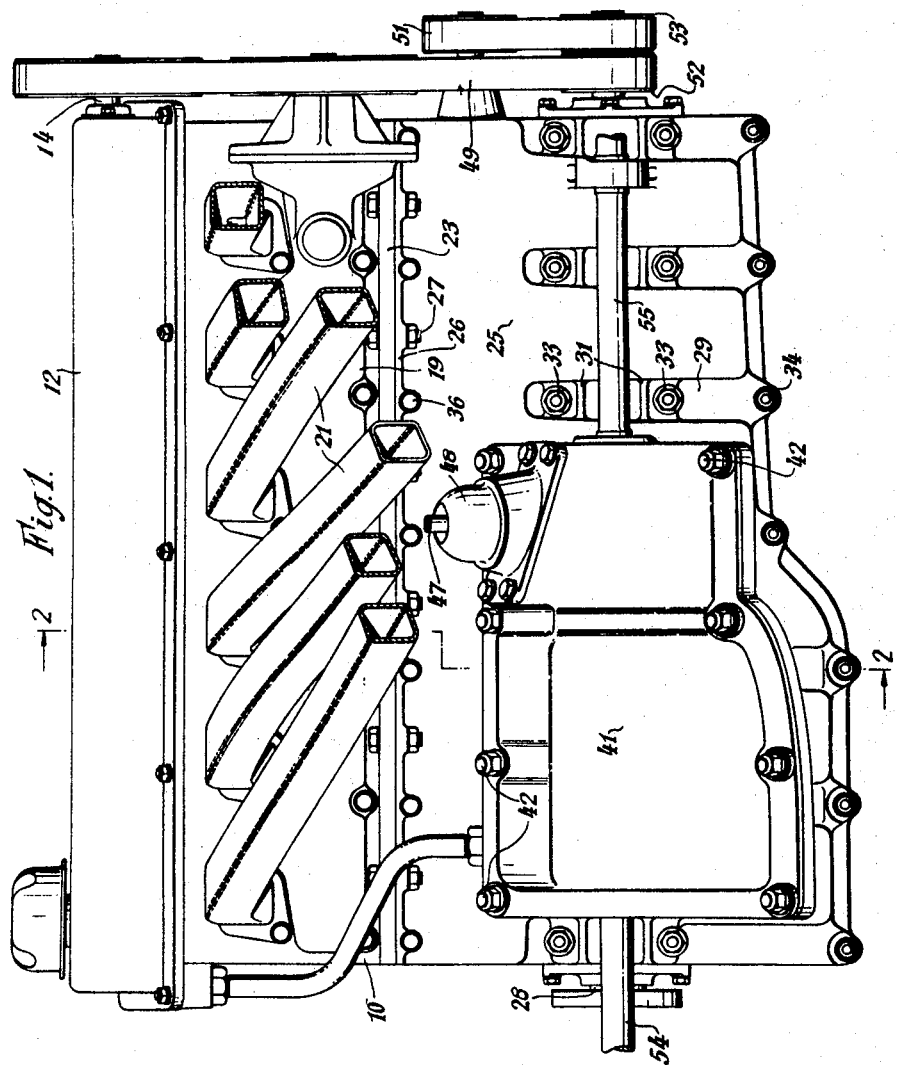
INVENTOR
Laurence E. W. Pomeroy
BY
Stevens, Davis, Miller & Mosher
ATTORNEYS July 23, 1968      L. E. W. POMEROY      3,393,580
POWER UNITS FOR MOTOR VEHICLES
Filed Nov. 24, 1965      7 Sheets-Sheet 2
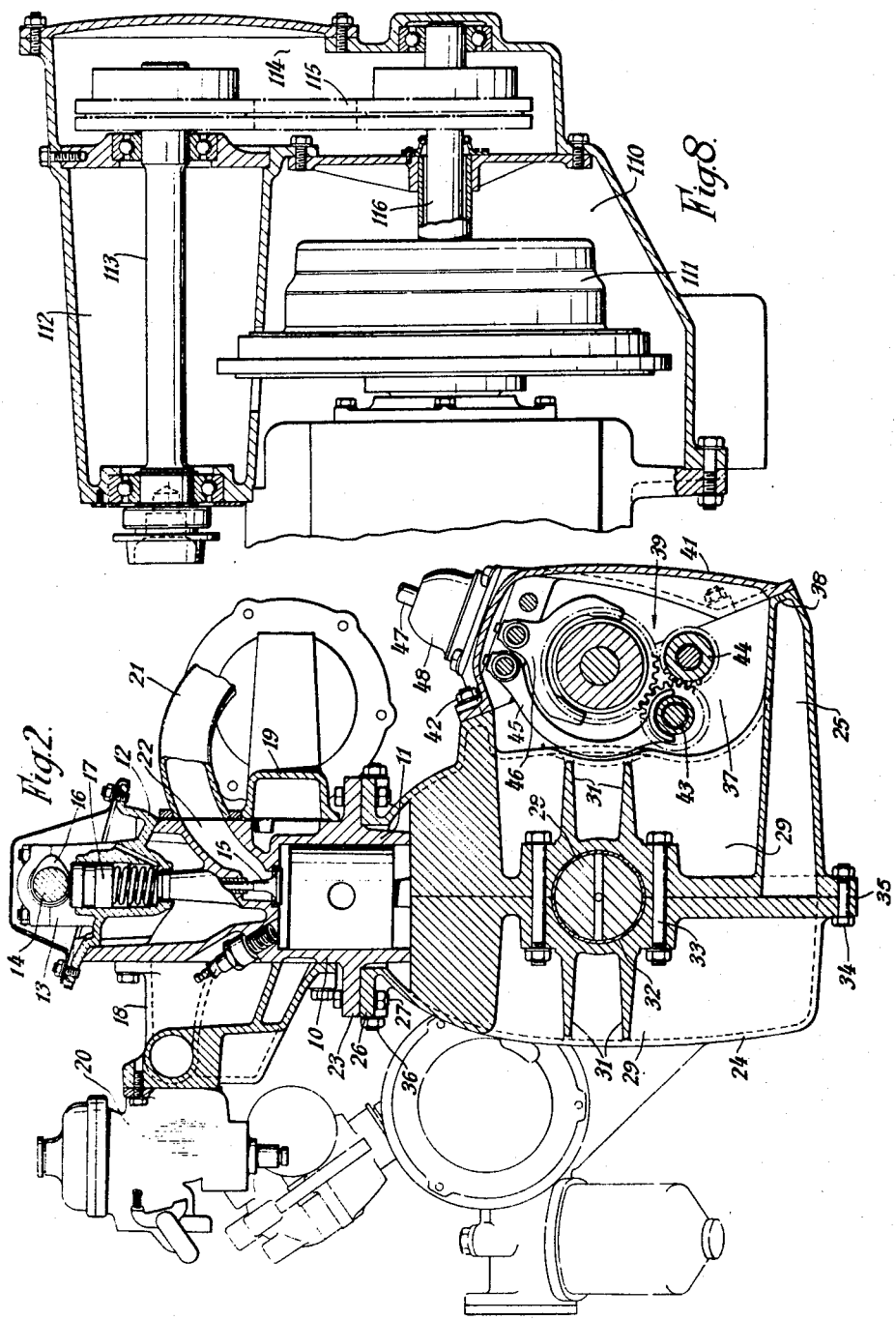
INVENTOR
Laurence E. W. Pomeroy
BY
Stevens, Davis, Miller & Mosher
ATTORNEYS July 23, 1968  L. E. W. POMEROY  3,393,580
POWER UNITS FOR MOTOR VEHICLES
Filed Nov. 24, 1965   7 Sheets-Sheet 3
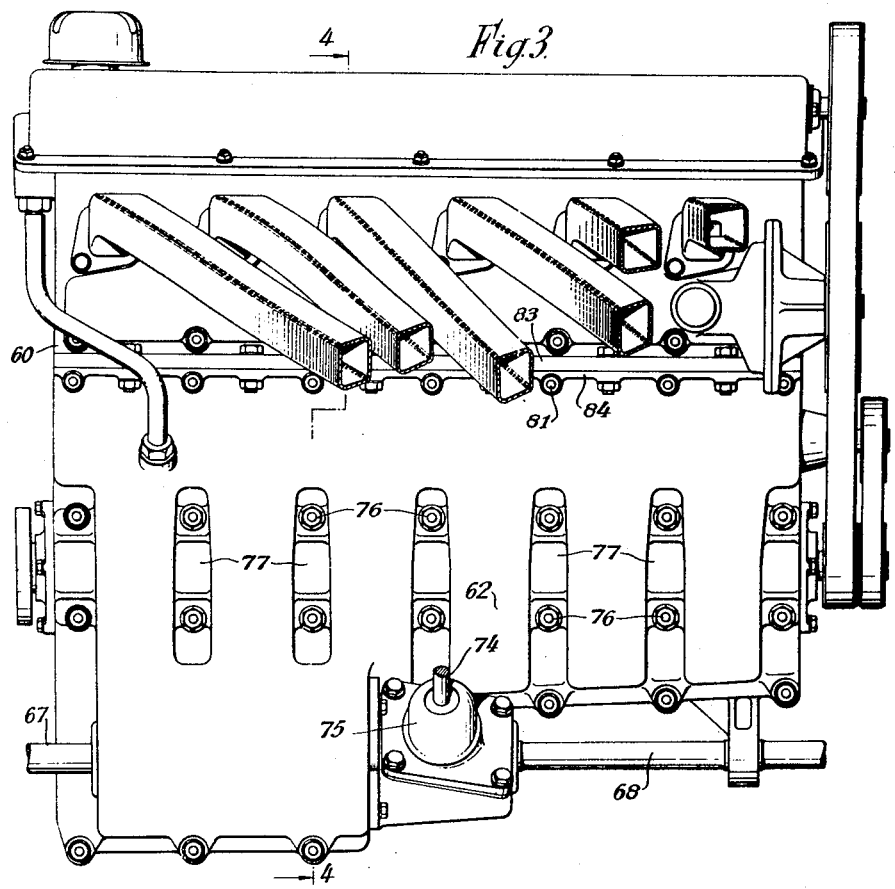
INVENTOR
Laurence E.W. Pomeroy
BY
Stevens, Davis, Miller & Mosher
ATTORNEYS

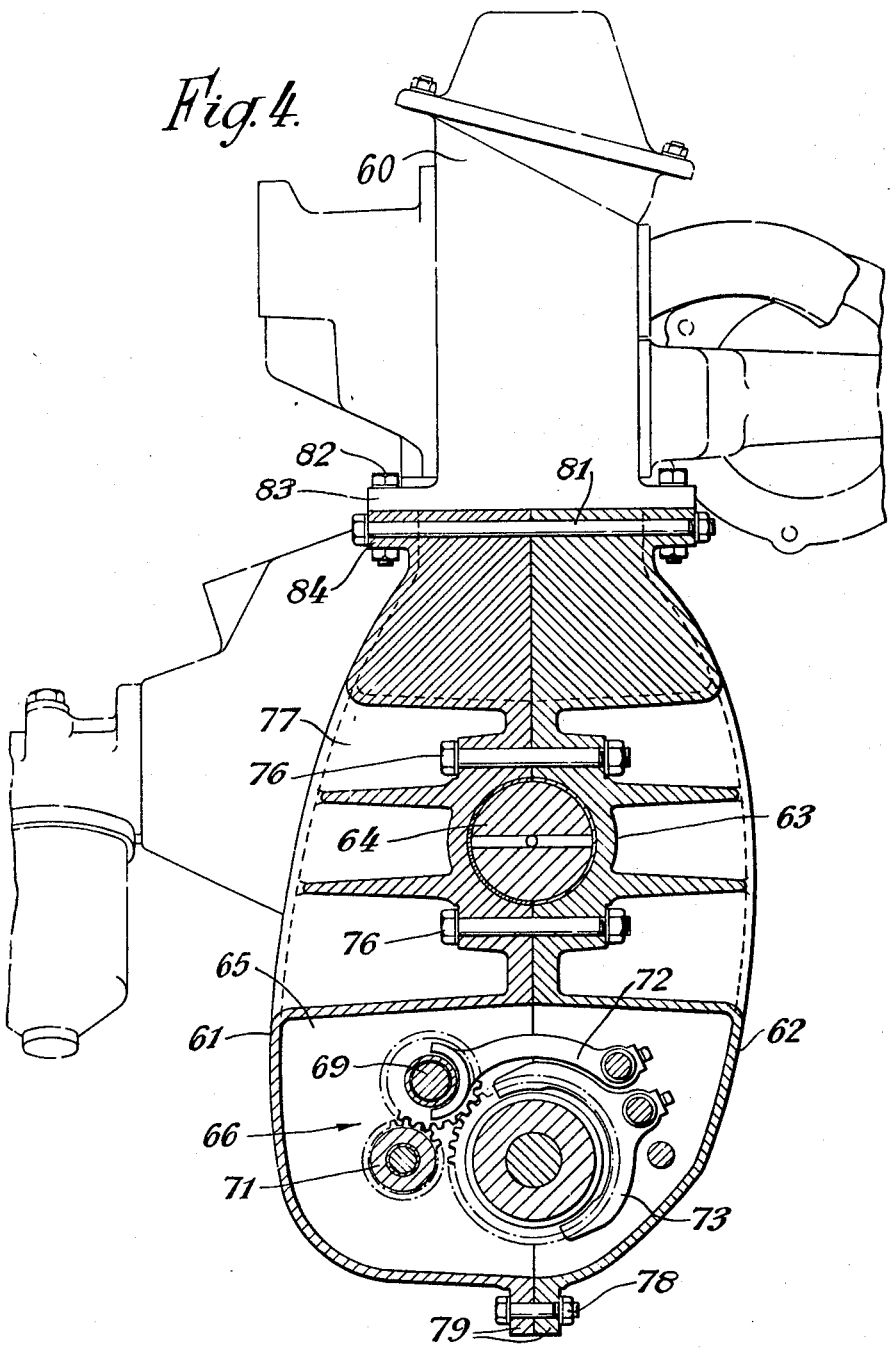

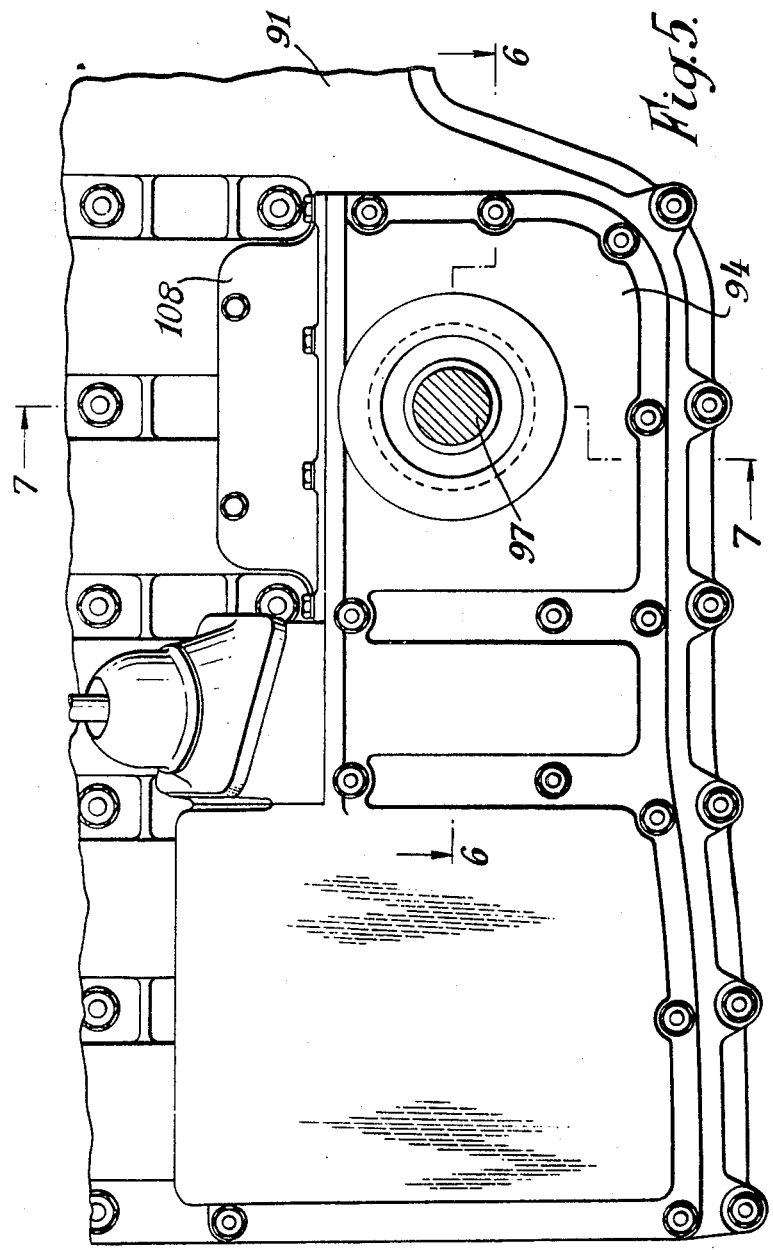

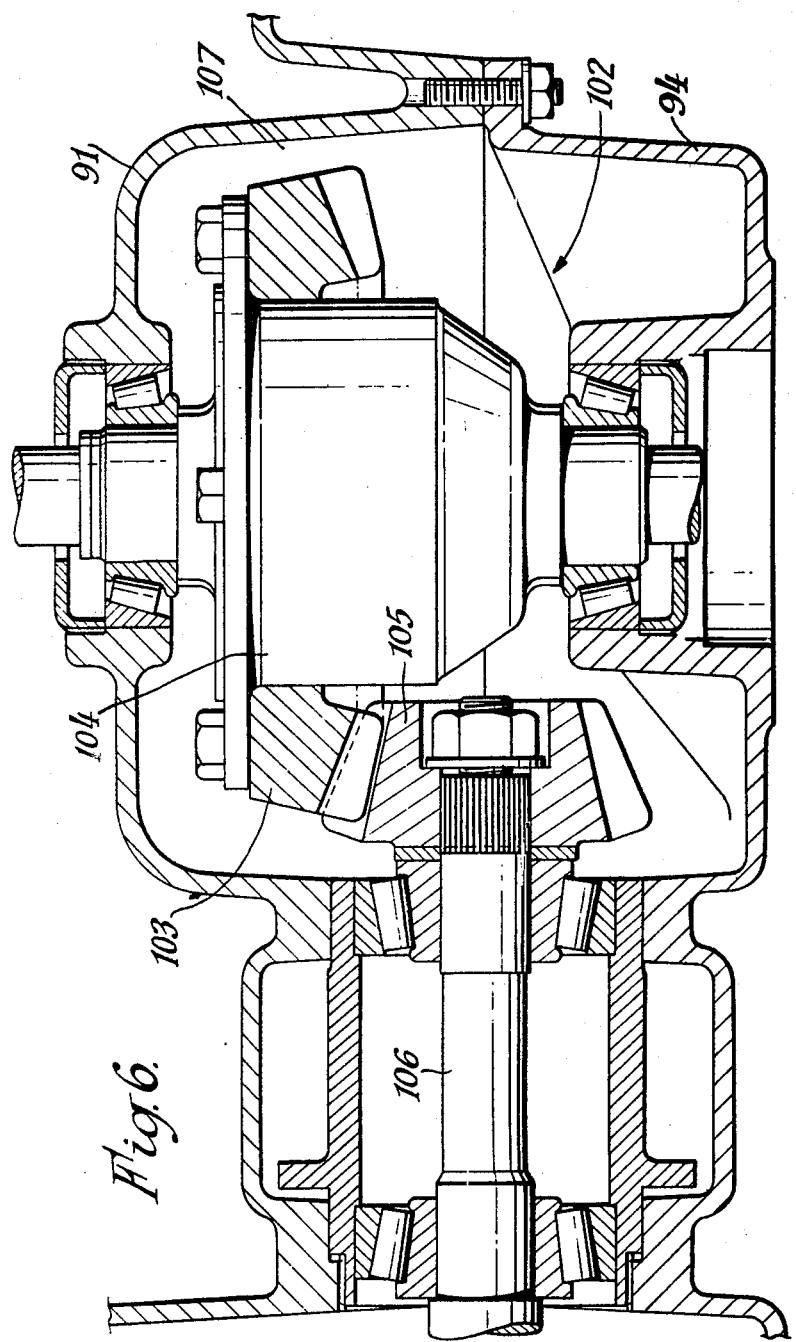

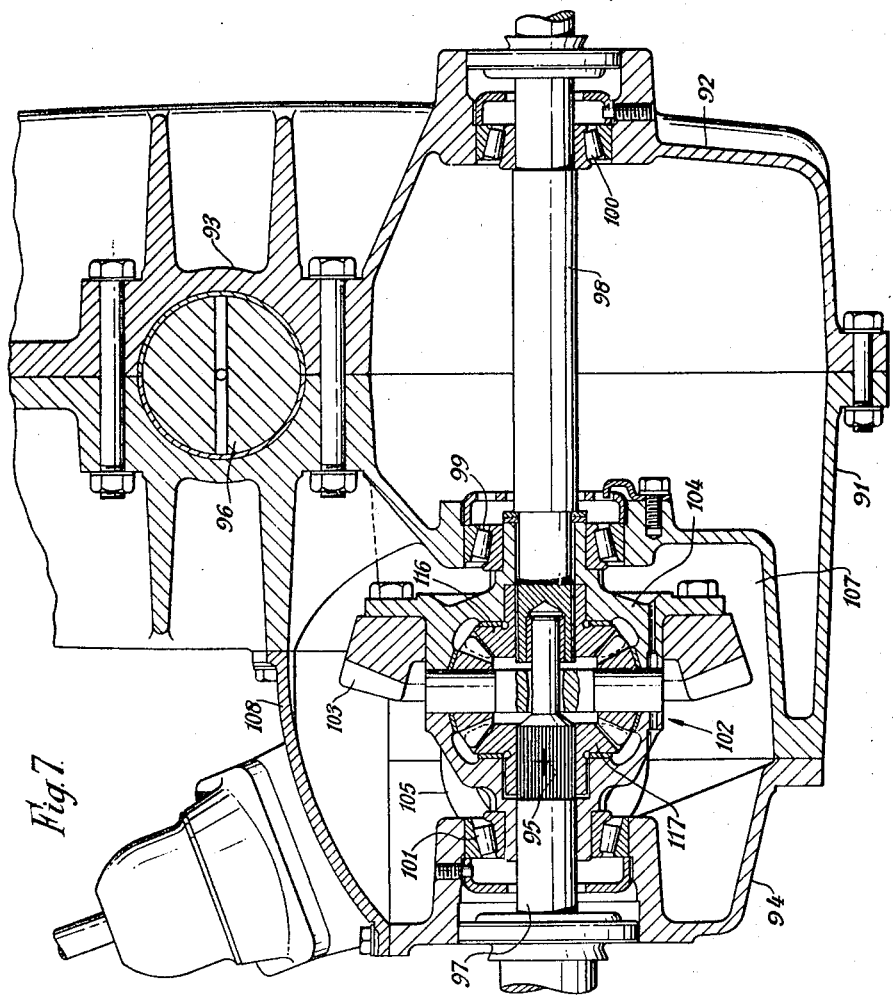

United States Patent Office 3,393,580
Patented July 23, 1968

3,393,580
POWER UNITS FOR MOTOR VEHICLES
Laurence E. W. Pomeroy, London, England; Anthony James Sumption, Cecil Clutton, and Edward Kent Halliburton Karslake, all of London, England, executors of the estate of said Pomeroy, deceased, assignors to The British Aluminium Company Limited
Filed Nov. 24, 1965, Ser. No. 509,521
Claims priority, application Great Britain, Nov. 24, 1964, 47,797/64
8 Claims. (Cl. 74—606)

ABSTRACT OF THE DISCLOSURE

A power unit for a motor vehicle including an internal combustion engine and a change-speed gear, the crankcase of the engine, which houses the change-speed gear, comprising two parts both separate from the engine cylinder block and meeting in a plane containing the axes of the engine cylinders and the axis of the crankshaft, each of the said crankcase parts having formed in it one half of each bearing housing for the crankshaft, and at least one of said crankcase parts also having formed in it one half of each of a number of bearing housings for shafts of the change-speed gear.

---

This invention relates to power units for motor vehicles, the term "power unit" being used to designate an internal combustion engine in combination with a change-speed gearbox through which the drive is transmitted to the road wheels of the vehicle.

It is an object of the invention to provide a compact power unit.

According to the present invention, a power unit for a motor vehicle comprises an engine the crankcase of which is split in a central longitudinal vertical plane, the housings for the main bearings of the engine crankcase being formed half in each of the two halves of the crankcase and at least one half of the said split crankcase also having formed in it one half of the bearing housings for the main shafts of a change-speed gear housed in the said crankcase and driven by the engine.

The halves of the bearing housings for the main shaft of the change-speed gear may be formed each in one half of the crankcase at the meeting faces of said halves.

Alternatively, halves of the bearing housings for the main shaft of the change-speed gear may be formed in an open face of one half of the crankcase other than that face which meets the other half of the crankcase, and an additional cover may be provided which includes or encloses the other halves of said bearing housings.

There may be formed integral with each half of the crankcase a corresponding part of a divided flywheel housing, and chain or spur gearing in the said housing connects the engine crankshaft to the input shaft of the change-speed gear.

The invention is hereinafter described with reference to the accompanying drawings, in which:

FIGURE 1 is a side elevation of one form of power unit according to the present invention;

FIGURE 2 is a transverse sectional elevation taken on the line 2—2 of FIGURE 1;

FIGURE 3 is a side elevation, similar to FIGURE 1 but with some parts omitted, of a modified form of engine;

FIGURE 4 is a transverse sectional elevation on the line 4—4 of FIGURE 3;

FIGURE 5 is a partial side view, similar to FIGURES 1 and 3, of another form of power unit according to the invention;

FIGURE 6 is a sectional plan view taken on the line 6—6 of FIGURE 5;

FIGURE 7 is a sectional elevation taken on the line 7—7 of FIGURE 5; and

FIGURE 8 is a sectional plan view of a casing to house the elements by which the drive is transmitted from the engine crankshaft to the change-speed gear.

Referring to FIGURES 1 and 2 the power unit comprises a cylinder block unit 10 which includes the heads of the engine cylinders, one of which cylinders is shown at 11 in FIGURE 2. Water-jacket cavities in the cylinder head are closed by suitable cover pieces, one of which consists of a top cover 12 carrying the bearings 13 for an overhead camshaft 14 carrying cams to actuate the inlet and exhaust valves of the engine. One exhaust valve is shown at 15 in FIGURE 2, and is actuated by a cam 16 on the camshaft through a self-adjusting tappet 17. Other covers 18 and 19 close the cavities at the sides of the cylinder block, the cover 18 also including an inlet manifold and having the carburettor 20 mounted on it. Separate exhaust conduits 21 lead from the exhaust passages 22 in the cylinder block.

Horizontal flanges 23 are formed on the cylinder block 10 near the lower ends of the cylinders.

A vertically-longitudinally split crankcase comprising two sections 24 and 25 has external flanges 26 along its upper edges and is secured by bolts 27 through the said flanges to the flanges 23 on the cylinder block. Each section of the crankcase contains one half of each of a plurality of bearing housings for the engine crankshaft 28, the walls of the crankcase sections being shaped to form deep narrow external recesses 29, bridged by webs 31 for stiffening purposes, extending inwardly to the bearing housings. The crankshaft 28 is mounted in bearing shells 32 in the bearing housings, and the two sections of the crankcase are secured together by transverse bolts 33 passing through the bearing housings, as well as by transverse bolts 34 passing through mating flanges 35 along the lower edges of the meeting faces of the said sections, and further transverse bolts 36 at the top of the crankcase passing between the engine cylinders.

The section 25 of the crankcase is formed with a cavity 37 opening at one side thereof and surrounded by a flat rim surface 38. Bearing housings for the coaxial main input and output shafts of a speed reduction gear train 39 are formed half in the said section 25 and half in a cover 41 secured against the flat rim surface 38 by bolts 42. Suitable provision is made for mounting a layshaft 43 and a reverse pinion 44. Gear selectors 45, 46 are slidably mounted in the space enclosed by the cover 41, and are controlled by a lever 47 projecting from the said space and mounted on a ball joint at 48.

The input shaft 54 of the speed reduction gear train, as shown in FIGURE 1, projects forwardly from the crankcase, into a housing shown separately in FIGURE 8, and is driven, by a friction clutch and chain gearing in that housing, from the engine crankshaft 28.

The output shaft 55 of the said gear train extends rearwardly for coupling by a conventional propeller shaft (not shown) to a rear axle of a vehicle.

Toothed belts 49 and 51 co-operating with suitable pulleys 52, 53 on the crankshaft 28 drive the camshaft 14 and the usual accessories.

In the arrangement shown in FIGURES 3 and 4 of the drawings the cylinder block unit 60 is substantially identical with that shown in FIGURES 1 and 2. The crankcase is again split in a longitudinal vertical plane into two sections 61 and 62, the bearing housings 63 for the engine crankshaft 64 being formed half in each of the said sections, the said crankcase being extended downwardly for part of its length to provide a cavity 65 in which is mounted a change-speed gear train 66. The coaxial main input and output shafts 67 and 68 of the gear train 66 are mounted in bearing housings formed half in each of the sections 61 and 62 of the crankcase, and the layshaft 69 of the gear train, as well as the reverse gear idler 71, are mounted in separate bearings. The input shaft 67 of the change-speed gear train is driven from the engine crankshaft substantially as described with reference to FIGURES 1 and 2, the shape of the housing enclosing the drive being altered to correspond to the different relation of the two shafts. Selectors 72, 73 for selecting the gear ratios are suitably mounted in the cavity 65, and are operated by a lever 74, extending out of the cavity and having a universal mounting at 75.

The two sections 61 and 62 of the crankcase are, as in the previously described embodiment secured one to the other by transverse bolts, including bolts 76 passing through the bearing housings 63 and accessible by way of external cavities 77 in the crankcase sections, bolts 78 passing through flanges 79 at the meeting faces of the sections, and bolts 81 through the upper part of the crankcase between the engine cylinders. The crankcase is secured to the cylinder block unit 60 by bolts 82 passing through flanges 83 and 84 on the cylinder block unit and the crankcase sections respectively.

FIGURES 5 to 7 show another arrangement of a power unit according to the invention, in which the drive is taken directly to road wheels between which the power unit is mounted, a transverse shaft passing through the crankcase below the main bearings being connected through universal joints to the said road wheels.

The crankcase is formed in two half sections 91 and 92 each including one half of each of the crankshaft bearing housings 93 as in the previously described arrangement, and the section 91 having an open side to which is bolted a cover member 94 enclosing the change-speed gear train, the coaxial input and output shafts of the said gear train being mounted in bearings the housings for which are formed partly in the section 91 and partly in the cover member 94 so that the axes of the shafts lie in the plane at which the said section and cover member meet. The axis of the said shafts is indicated by a cross at 95 in FIGURE 7, and it will be observed that it is below and to one side of the axis of the crankshaft 96.

The casing 104 of a differential mechanism 102 is supported by tapered roller bearings 99 and 101, carried respectively in the crankcase section 91 and in the cover member 94, and is driven through its bevel gear 103 by the bevel pinion 105 mounted on the output shaft 106 (FIGURE 6) of the change-speed gear train. A half-shaft 98 is mounted at its outer end in tapered roller bearing 100 carried in section 92 of the crankcase, and at its inner end in the bevel gear 116, which is a running fit in the differential casing. A secured half-shaft 97 is a running fit in the differential casing 104 and its inner end is located in a plain bearing in the inner end of the half-shaft 98, there being a clearance between the bevel gear 117 and the differential casing 104.

The half-shafts 97, 98 are coupled through universal joints, not shown, to road wheels of the vehicle.

The crankcase shown in FIGURES 5 to 7 is secured to the engine cylinder block in the manner already described.

An opening in the upper part of the cover member 94 is closed by a further cover 108 permitting access to the differential gearing without removing the main cover member 94 and thus disturbing the change-speed gear train.

Worm or skew gearing may be used instead of bevel gearing to drive the differential mechanism.

In any one of the power units herein described, the engine crankshaft may drive the input shaft of the change-speed gear train through a friction clutch, a fluid flywheel, a fluid torque converter or any other form of drive take-up device, in combination with a chain or toothed belt or spur gear drive.

The take-up device and chain or spur gearing may be housed in a flywheel housing which, like the crankcase itself is vertically divided, one half being formed integral with each half of the crankcase itself. Alternatively, the said parts may be enclosed by a separate flywheel housing bolted to the end of the engine crankcase, and FIGURE 8 shows such a separate flywheel housing for use with the power unit shown in FIGURE 1.

The said housing defines a main chamber 110 of substantially circular cross-section to house a friction clutch 111 or other drive take-up device, a second smaller chamber 112 also of circular cross-section to house an extension of the input shaft 113 of the change-speed gear train, and a further chamber 114 extending across the ends of the chambers 110 and 112 to house a duplex chain drive 115 connecting a shaft 116 coaxial with the crankshaft and driven by the clutch 111, to the input shaft extension 113.

Using the arrangement according to FIGURES 3 and 4 of the drawings, the main drive shaft emerges from the power unit on a centre line some distance below the axis of the crankshaft. If, therefore, the power unit is embodied in a conventional front-engine rear-drive installation, with the crankshaft positioned at substantially its usual position in a vertical sense, the propeller shaft is at a lower level and the usual floor tunnel is eliminated or reduced in height.

In all of the embodiments described, the clutch, torque converter or other driven take-up device is mounted at the front end of the power unit, thus avoiding the need for a bulge in the toe-board of the vehicle to accommodate the clutch or torque converter housing, since the location of the said housing at the forward end does not necessitate setting the power unit back to provide satisfactory weight distribution. This is because the said housing and the parts contained in it are of relatively light weight.

If, in an internal combustion engine having the cylinder block and head formed as an integral casting of aluminum or light alloy so that the crankcase is not integral with the cylinders, the crankcase is, as usual, split horizontally at or near the level of the crankshaft axis, the beam stiffness of the crankcase is very much reduced, which is undesirable. It has therefore been proposed to provide a crankcase which is split vertically on the centre line of the crankshaft, the two halves being secured together by through bolts. The present invention provides for the accommodation of a change-speed gear as well as the crankshaft in such a crankcase, using a crankcase of greater depth which still further increases its beam stiffness.

I claim:

1. A power unit for a motor vehicle comprising a cylinder block including at least one cylinder bore, a crankcase comprising two parts both separate from the cylinder block and meeting in a plane containing the axis of said cylinder bore, a crankshaft mounted in said crankcase with its axis in said meeting plane, main bearing housings for said crankshaft each formed with one half in each of said crankcase parts, a change-speed gear housed in said crankcase and having shafts carrying the gear members thereof, bearing housings for said shafts of said change-speed gear, at least a portion of said bearing housings being disposed in at least one of said crankcase parts, fixing means to secure said crankcase parts to each other and to the cylinder block, and means drivingly connecting said crankshaft to said change-speed gear.

2. A power unit according to claim 1, wherein the halves of the bearing housings for the main shafts of the change speed gear are formed each in one half of the crankcase at the meeting faces of said halves.

3. A power unit according to claim 1, wherein halves of the bearing housings for the main shafts of the change-speed gear are formed in an open face of one half of the crankcase other than the face which meets the other half of the crankcase, and an additional cover is provided which includes or encloses the other halves of said bearing housing.

4. A power unit according to claim 1, wherein the input shaft of the change-speed gear train is driven from the crankshaft through a drive take-up device and gearing mechanism mounted at the front end of the said power unit.

5. A power unit according to claim 1, further comprising a divided flywheel housing, each half part of which is formed integral with a corresponding half of the crankcase, and further comprising connecting means in said housing to operatively connect the engine crankshaft to the input shaft of the change-speed gear to drive said change-speed gear.

6. A power unit according to claim 1, further comprising a pair of half-shafts mounted transversely on the crankcase below the crankshaft, a differential mechanism supported by bearings in the walls of said crankcase, and means operatively connecting said differential mechanism and said change-speed gearing to drive said differential mechanism.

7. A power unit for a motor vehicle comprising an engine the crankcase of which is split in a central longitudinal vertical plane, the housings for the main bearings of the engine crankshaft being formed half in each of the two halves of said crankcase; a change-speed gear housed in the said crankcase and driven by the engine, one half of the bearing housings for the main shafts of said change-speed gear being formed in at least one half of said split crankcase; a divided flywheel housing, each portion of which is formed integral with a corresponding half of the crankcase; and connecting means in said housing to operatively connect the engine crankshaft to the input shaft of said change-speed gear to drive said change-speed gear.

8. A power unit for a motor vehicle comprising an engine the crankcase of which is split in a central longitudinal vertical plane, the housings for the main bearings of the engine crankshaft being formed half in each of the two halves of said crankcase; a change-speed gear housed in the said crankcase and driven by the engine, one half of the bearing housings for the main shafts of said change-speed gear being formed in at least one half of said split crankcase; a pair of half-shafts mounted transversely on the crankcase below the crankshaft; a differential mechanism connecting said half-shafts and supported by bearings in the walls of said crankcase; and means operatively connecting said differential mechanism and said change-speed gearing to drive said differential mechanism.

References Cited

UNITED STATES PATENTS

| | | | |
|---|---|---|---|
| 2,018,794 | 10/1935 | Kremser | 74—606 X |
| 2,699,841 | 1/1955 | Gunderson | 74—606 X |
| 2,833,163 | 5/1958 | Trombley | 74—606 X |
| 3,163,126 | 12/1964 | Kugel et al. | 74—606 X |
| 3,175,283 | 3/1965 | Baudras-Chardigny | 74—606 X |

FRED C. MATTERN, JR., *Primary Examiner.*

W. S. RATLIFF, *Assistant Examiner.*